United States Patent
Eriksson et al.

(10) Patent No.: US 6,757,151 B2
(45) Date of Patent: Jun. 29, 2004

(54) CAPACITOR ELEMENT FOR A POWER CAPACITOR, A POWER CAPACITOR COMPRISING SUCH ELEMENT AND A METALLIZED FILM FOR A POWER CAPACITOR

(75) Inventors: Esbjorn Eriksson, Bonninge (SE); Tommy Holmgren, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/181,145

(22) PCT Filed: Jan. 11, 2001

(86) PCT No.: PCT/SE01/00037

§ 371 (c)(1),
(2), (4) Date: Oct. 2, 2002

(87) PCT Pub. No.: WO01/52286

PCT Pub. Date: Jul. 19, 2001

(65) Prior Publication Data

US 2003/0090854 A1 May 15, 2003

(30) Foreign Application Priority Data

Jan. 14, 2000 (SE) .............................................. 0000113

(51) Int. Cl.[7] .............................................. H01G 4/015
(52) U.S. Cl. ..................... 361/273; 361/301.5; 361/323
(58) Field of Search ................................ 361/273, 277, 361/275.1–275.4, 301.5, 301.1, 303–305, 323, 301.2

(56) References Cited

U.S. PATENT DOCUMENTS

| | | | | |
|---|---|---|---|---|
| 4,464,700 A | * | 8/1984 | Stenerhag et al. | 361/307 |
| 4,509,234 A | * | 4/1985 | Voglaire | 29/25.42 |
| 6,256,188 B1 | * | 7/2001 | Lovkvist et al. | 361/301.3 |

FOREIGN PATENT DOCUMENTS

| | | | | |
|---|---|---|---|---|
| EP | 0056010 A2 | 7/1982 | | |
| GB | 2298962 A | 9/1996 | | |
| JP | 2-72609 | * | 3/1990 | ............ H01G/4/24 |
| JP | 5-217799 | * | 8/1993 | ............ H01G/4/24 |

* cited by examiner

Primary Examiner—Dean A. Reichard
Assistant Examiner—Eric W Thomas
(74) Attorney, Agent, or Firm—Nixon & Vanderhye P.C.

(57) ABSTRACT

A capacitor element (20) for a power capacitor with a dielectric film layer (3) and an electrode layet arranged on each flat side of the film layer, which electrode layers are divided into at least three metallized areas (4, 9, 10), separate from each other, in order to form an inner series connection arranged to conduct a load current, of which thee areas at least one is divided into segments (5) separated by non-metallized sections (6), and at least one bridge (7) arranged to electrically connect two of the segments together. In accordance with the invention the bridge is so arranged that, in the area divided into segments, the load current appears substantially only in the segments. The invention also relates to a power capacitor with such a capacitor element and also a metallized tape for such a power capacitor.

14 Claims, 4 Drawing Sheets

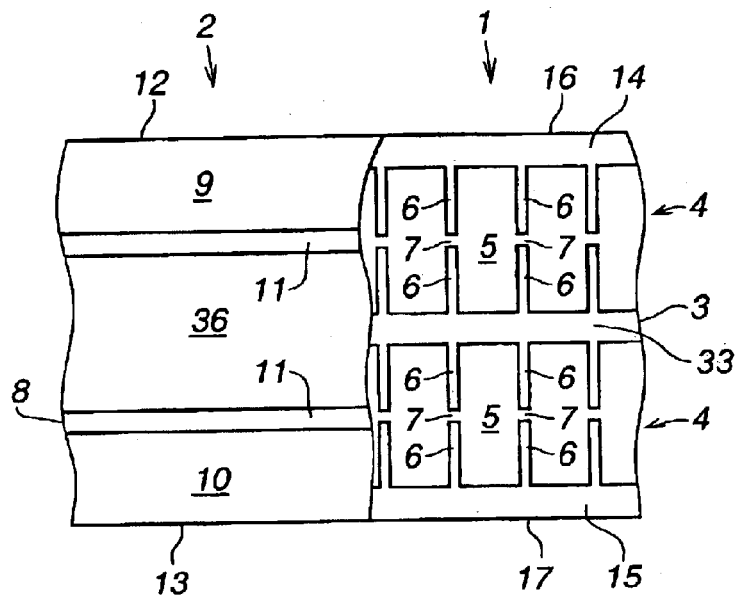
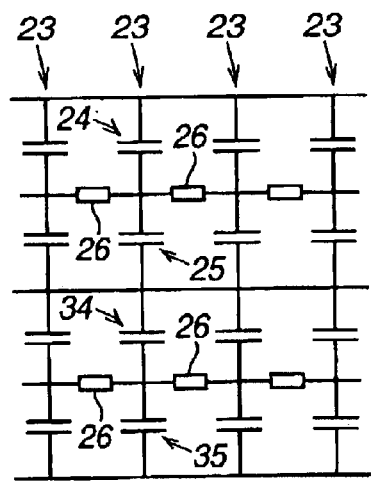
Fig. 4          Fig. 5
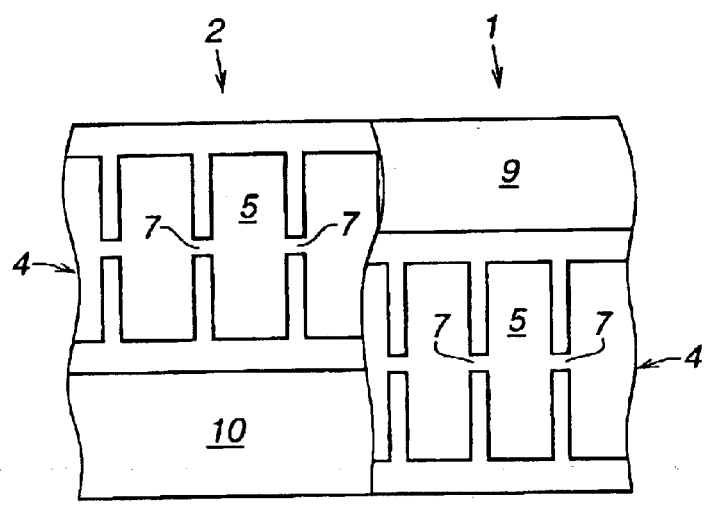
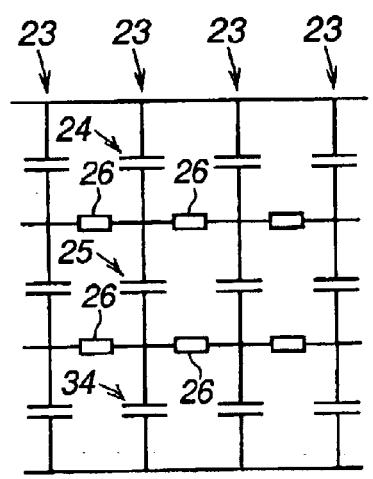
Fig. 11         Fig. 12

US 6,757,151 B2

CAPACITOR ELEMENT FOR A POWER CAPACITOR, A POWER CAPACITOR COMPRISING SUCH ELEMENT AND A METALLIZED FILM FOR A POWER CAPACITOR

TECHNICAL FIELD

The present invention relates to a capacitor element for a power capacitor, including at least one elongated film layer of dielectric material, and an electrode layer of metal material arranged on each flat side of the film layer, which two electrode layers are divided into at least three metallized areas, separated from each other, in order to form an inner series connection arranged to conduct a load current. The three areas extend in the longitudinal direction of the film layer and at least one area of said at least three areas is divided into segments separated by non-metallized sections, and at least one bridge arranged to electrically connect two of the segments together.

The invention also relates to a power capacitor comprising such a capacitor element and also a metallized tape for such a power capacitor.

In this context power capacitors refers to capacitors for alternating or direct current applications for voltages exceeding 1 kV, preferably at least 5 kV.

BACKGROUND ART

In power capacitors it is known to use rolled capacitor elements comprising metallized tapes formed from sandwiched films of dielectric material and electrode layers of metal material. It is also known to divide the electrode layer into electrically separated, parallel metallized areas extending in the longitudinal direction of the films, in order to achieve series-connected part-capacitors between the end surfaces of the roll, known as "inner series connection". It is further more known to divide one or more of the metallized areas into segments separated by non-metallized sections, and also bridges arranged to electrically connect the segments together. Segmentation increases the equivalent surface resistivity of the metallized area, which has been found to benefit the so called "self-healing" capacity of the capacitor element. This means that in the event of an electric puncture in a film layer, the electrode material nearest the fault point is vaporized due to a powerful, but brief, discharge current endeavouring to pass the short circuit. The electric strength in the area is restored when the electrode material nearest the fault point has vaporized, and the capacitor element has thus self-healed. As a result of the lost electrode area, every self-healing process produces a slight decrease in the capacitance of the capacitor element. If a self-healing process occurs in a segment, the bridges ensure that sufficient energy can be transferred from adjacent elements to enable efficient vaporization of the electrode material around the fault point. If a serious fault occurs, e.g. if the puncture passes through several film layers, a strong current surge occurs through the bridges connected to the defective segment. If the current surge is sufficiently strong the bridges themselves may be vaporized, in which case the faulty segment is isolated. The lose in capacitance is in this case greater than at the self-healing process.

A segmented, metallized tape for a capacitor element of the above type is described, for instance, in the document GB 2 298 962A in connection with FIG. 4. The tape described consists of a film on which two segmented, metallized areas are arranged. Each segment is connected by bridges to two of its neighbouring segments. The metallized film is in this case intended for a capacitor element with one inner series connection.

During operation the rolled capacitor element is electrically connected at both its end surfaces and a current, in the following termed load current, flows continuously between these surfaces and causes Joule losses in the capacitor element. The load current follows the path of least resistance between the end surfaces. In the case of alternating current the alternating current itself is responsible for a considerable proportion of the Joule losses and in the case of direct current, ripple currents are responsible for most of the Joule losses. One problem with capacitor elements comprising known metallized tape of the type described above is that Joule losses occur in the bridges during normal operation. This is particularly so in applications involving high current. The generation of heat in known capacitor elements with metallized tape of the above type may be so great that it determines the dimensions of their design.

DESCRIPTION OF THE INVENTION

One object of the present invention is to eliminate the above-mentioned problems and provide a capacitor element comprising a segmented, metallized area where two adjacent segments are electrically connected by means of a bridge in accordance with a new principle.

The capacitor element and the power capacitor in accordance with the invention provide the bridge so arranged that the load current in the area divided into segments appears primariry in segments.

The metallized tape in accordance with the invention provides that at least one of the bridges is arranged in a portion of the non-metallized section that extends perpendicularly or substantially perpendicularly to the long sides of the dielectric film.

In accordance with the invention the bridge is arranged so that the load current appearing in the capacitor element does not pass through this to any great extent. However, the bridge is arranged so that a certain current exchange is permitted between neighbouring segments, e.g. at self-healing processes or in order to equalize small differences in potential. Contrary to the load current, the currents at these current exchanges are so low or of such short duration that they do not cause any great Joule losses.

In accordance with one embodiment of the invention the bridges are arranged in parts of non-metallized sections extending perpendicularly or substantially perpendicularly to the connection surfaces of the capacitor element. Since the load current strives to follow as "straight" a current path as possible, i.e. strives to follow an electric circuit extending perpendicularly to the connection surfaces of the capacitor elements, forming the shortest path between the connection surfaces, a bridge that connects together two segments perpendicularly to this electric circuit will not be included in the electric circuit of the load current. This embodiment of the invention also contributes to a high resistance perpendicular to the direction of the load current, which is beneficial.

In accordance with another embodiment of the invention the segments connected together by the bridge are uniform.

In accordance with one embodiment of the power capacitor according to the invention, the power capacitor comprises a plurality of capacitor elements, that have substantially circular-cylindrical shape, are arranged close together so that their axial directions coincide, and are connected to each other so that they form a series-connected capacitor stack. In such a power capacitor for high voltage the technique of using inner series-connections in the capacitor elements is an obvious advantage since the number of series-connected capacitor elements can be reduced. The technique is particularly advantageous together with the technique mentioned above for self-healing. Since successful self-healing requires particularly thin metal coating and the currents flowing through the metal generate active power dissipation (heat), thinner layers result in higher losses. One way of reducing the losses without compromising the requirement for a thin metal coating is to choose a shape for the metallized film, and thus a shape for the capacitor element, such that the dimension of the metal coating perpendicular to the rolling direction is decreased and the length of the roll is increased. Unless internal series-connection is used, the consequence of this will be that the cylindrical capacitor elements acquire a relatively little height in relation to their diameter. Series-connecting many such elements, which is required for high voltage, becomes detrimental from the cost point of view. With inner series connections, therefore, several series-connected part-capacitors can automatically be built into a cylindrical capacitor element with an optimal relation between height and diameter, from the manufacturing aspect, and with good self-healing properties.

DESCRIPTION OF THE DRAWINGS

The invention will be described in more detail in the following with reference to the drawings, in which FIG. 4 shows a second embodiment of two metallized tapes for a capacitor element in accordance with the invention, FIG. 5 shows an equivalent circuit diagram for the tapes in FIG. 4, FIG. 11 shows yet another embodiment of two metallized tapes in accordance with the invention, FIG. 12 shows an equivalent circuit diagram for the metallized tapes shown in FIG. 11.

DESCRIPTION OF EMBODIMENTS

Figure 1:
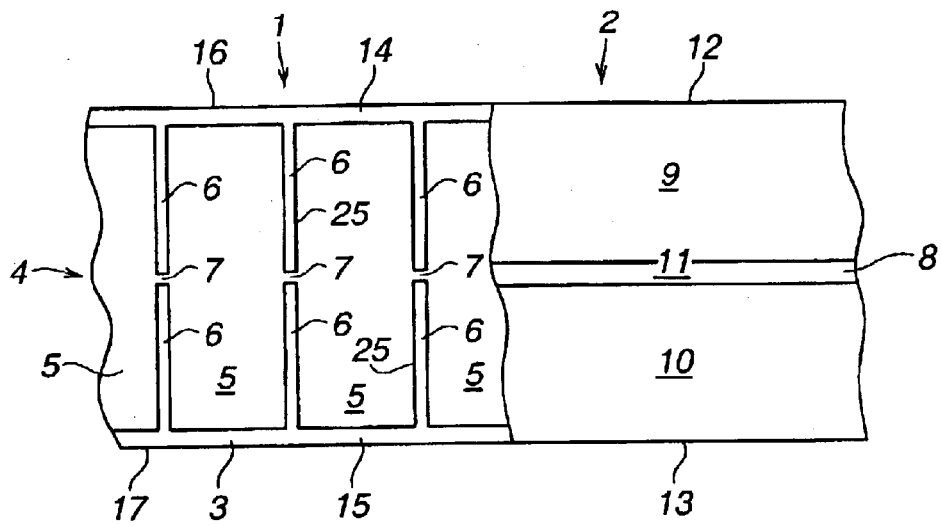
FIG. 1 shows a first embodiment of two metallized tapes for a capacitor element in accordance with the invention.

FIG. 1 shows a view from above of a first embodiment of two elongated metallized tapes 1, 2 placed one on top of the other in accordance with the invention. The first tape 1 comprises an elongated dielectric film 3 of predetermined breadth, extending between two parallel long sides 16, 17. The upper, visible, surface of the film 3 is partially coated with a thin layer of metallic electrode material forming a coherent metallized area 4 of predetermined breadth. The lower non-visible surface of the film 3 faces the second tape 2 and is uncoated. The area 4 comprises a plurality of parallel, rectangular and uniform segments 5 extending perpendicularly or substantially perpendicularly to the long sides 16, 17 of the film 3 and across the entire breadth of the area 4. The segments 5 are separated by corridor-like, non-metallized sections 6 extending parallel with and between the segments 5, i.e. perpendicularly or substantially perpendicularly to the long sides 16, 17 of the film 3. The metallized area 4 also comprises bridges 7 in the form of metallized sections that are arranged in the non-metallized sections 6 in order to electrically connect each segment 5 with its nearest neighbouring segments. The second metallized tape 2 comprises an elongated dielectric film 8 of substantially the same breadth as the film 3 of the first metallized tape 1, and extends between two parallel long sides 12, 13. The upper, visible, surface of the film 8 faces the uncoated side of the first tape 1, and is partially coated with a thin layer of metallic electrode material forming two parallel metallized areas 9, 10 extending in the longitudinal direction of the film 8 and separated by a corridor-like, non-metallized section 11. The lower non-visible surface of the film 8 is uncoated. The areas 9 and 10 extend to respective sides 12, 13 of the film 8 where they have increased thickness in order to facilitate electrical connection of the finished capacitor element. Two elongated, non-metallized sections 14, 15 separate the segments 5 and the long sides 16, 17 of the film 3.

Figure 3:
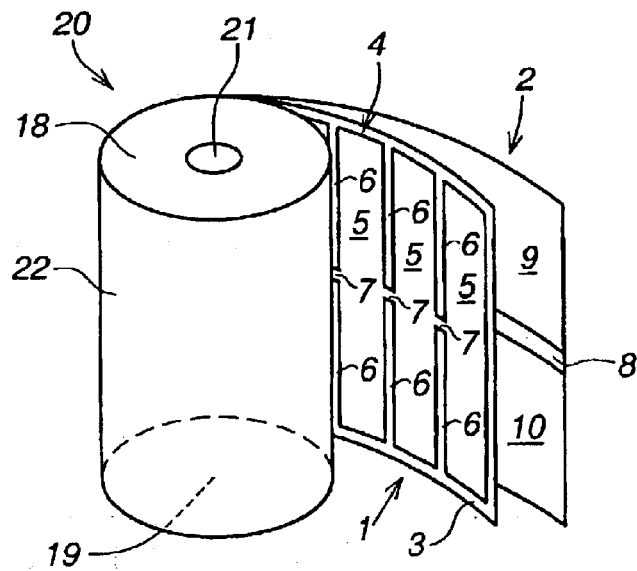
FIG. 3 shows a first embodiment of a capacitor element in accordance with the invention.

When producing a first embodiment of a capacitor element in accordance with the invention, the above-mentioned metallized tapes 1, 2 are wound to a roll so that the films 3, 8, and the metallic electrode material coated on the films 3, 8, form alternating layers of film and electrode. Such a capacitor element is shown in FIG. 3 where the metallized tapes 1, 2 in the capacitor element have been partly unrolled to reveal the structure of the capacitor element 20. The metallized areas 9 and 10 are connected at the respective end surfaces of the roll, which are parallel and form the connection surfaces 18, 19 of the capacitor element 20. The capacitor element has an inner series connection where the metallized area 9 is coupled capacitively with the segments 5 of the metallized area 4, and where the segments 5 are in turn coupled capacitively with the metallized area 10. In the capacitor element 20 the metallized tape 1 is enclosed on each flat side by the metallized tape 2, and the metallized tape 2 is enclosed on each flat side by the metallized tape 1 (except at the first turn of the metallized tape 1 that forms the interior surface 21 of the capacitor element 20 and the last turn of the metallized tape 2 that forms the envelope surface 22 of the capacitor element 20). Said capacitive couplings occur in the capacitor element 20 through both films 3, 8.

Figure 2:
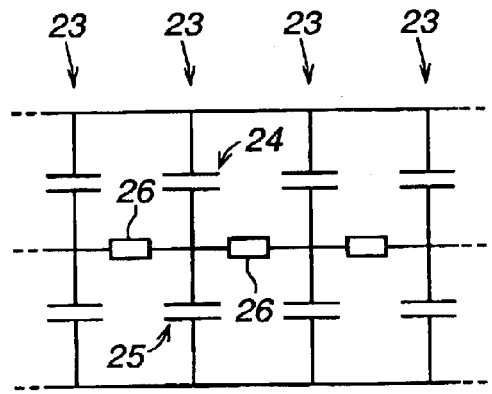
FIG. 2 shows an equivalent circuit diagram for the tapes in FIG. 1.

FIG. 2 shows a schematic equivalent circuit diagram for the metallized tapes 1, 2 described above. Thanks to the configuration of the metallized areas 4, 9, 10, the metallized tapes 1, 2 form a plurality of parallel-connected electric circuits 23 with two series-connected part-capacitors 24, 25 in each circuit. One part-capacitor 24 consists of the metallized area 9 and one of the segments 5, which are coupled together capacitively by means of the dielectric film 3. The other part-capacitor 25 consists of the same segment 5 and the metallized area 10, which are coupled together capacitively by means of the same film 3. Between the part-capacitors 24 and 25 each electric circuit 23 is connected with its nearest neighbouring circuit by means of resistors 26. The resistors 26 consist of the bridges 7.

The equivalent circuit diagram shown in FIG. 2 is also applicable for the capacitor element 20 shown in FIG. 3, with the addition that the capacitive couplings also occur through the film 8. During normal operating conditions voltage balance prevails between the electric circuits 23 since the load current flows substantially perpendicularly to the connection surfaces 18, 19 of the capacitor element 20. Since the non-metallized sections 6 that separate the segments 5 also extend perpendicularly to the connection surfaces 18, 19, no load current will flow through the bridges 7, i.e. through the resistors 26. In other words, the bridges 7 do not cause Joule losses during normal operation since they are not arranged in the electric circuit of the load current. At a self-healing process in any one of the segments, when an electric puncture has occurred through either of the films 3, 8, however, a voltage imbalance will occur between the electric circuit/segment in which puncture has occurred, and its neighbouring circuits/segments. The energy stored in the defective segment is usually insufficient to vaporize the metallic electrode material around the fault point to effect self-healing. However, due to the voltage imbalance, current will flow from the neighbouring circuits/segments to the defective circuit/segment through the resistors 26/bridges 7 so that sufficient energy is obtained to achieve the self healing. The current flowing through the resistors 26/bridges 7 during the self-healing process may be briefly relatively high but lasts for such a short time that it does not cause any great Joule losses in them.

Figure 8:
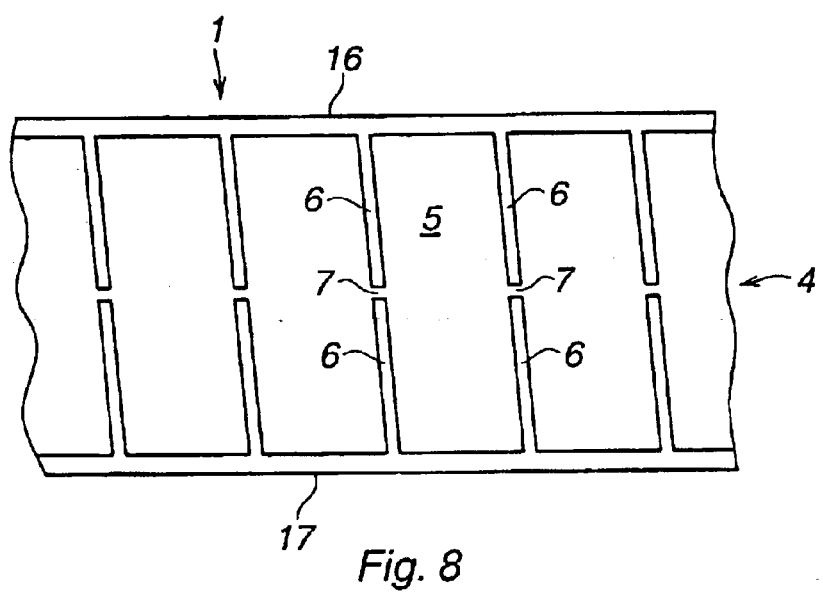
FIG. 8 shows a third embodiment of a metallized segmented tape in accordance with the invention.

From the manufacturing technique aspect it may be difficult to coat the metallized tape 1 described in connection with FIGS. 1 and 3 so that the non-metallized sections 6 extend exactly perpendicularly to the long sides 16, 17 of the film 3. Manufacture of the metallized tape 1 is facilitated if the non-metallized sections 6 are allowed to deviate from the perpendicular direction between the long sides 16, 17, although this is less favourable from the lose aspect. Such a metallized tape 1 is shown, seen from above, in FIG. 8, where the segments 5 are in the form of a parallelogram. However, as long as the deviation of the non-metallized sections 6 from the perpendicular direction between the long sides 16, 17 is slight, less than about 10°, the load current will appear substantially only in the segments 5 and the load current that passes through the bridges 7 will be negligible. The load current does not therefore cause any great Joule losses therein.

FIG. 4 shows a view from above of a second embodiment of two elongated metallized tapes 1, 2 placed one on top of the other in accordance with the invention, and FIG. 5 shows schematically an equivalent circuit diagram therefor. The tape 1 comprises a dielectric film 3 extending between two parallel long sides 16, 17. The upper, visible, surface of the film 3 is partially coated with a thin layer of metallic electrode material forming two identical metallized areas 4 of predetermined breadth that are electrically isolated from each other. The lower non-visible surface of the film 3 is uncoated. Each area 4 comprises a plurality of parallel, rectangular and uniform segments 5 extending substantially perpendicularly to the long sides 16, 17 of the film 3 and across the entire breadth of the area 4. The segments 5 are separated by corridor-like, non-metallized sections 6 extending parallel with and between the segments 5, i.e. perpendicularly or substantially perpendicularly to the long sides 16, 17 of the film 3. Each area 4 also comprises bridges 7 in the form of metallized sections that are arranged in the non-metallized sections 6 in order to electrically connect each segment 5 with its nearest neighbouring segment. In this embodiment each segment 5 is connected to each of its neighbouring segments by two bridges 7. The two metallized areas 4 are separated by a non-metallized section 33 extending in the longitudinal direction of the film 3. Two elongated, non-metallized sections 14, 15 separate the metallized areas 4 from the long sides 16, 17 of the film 3. The second metallized tape 2 is similar to the metallized tape 1 described in conjunction with FIG. 1, with the exception that it has three metallized areas 9, 10, 36. Two elongated non-metallized sections 11 separate the metallized areas 9, 10 and 36.

Thanks to the configuration of the metallized areas 4, 9, 10, 36, the metallized tapes 1, 2 form a plurality of parallel-connected electric circuits 23 as shown in FIG. 5. These run substantially perpendicularly to the long sides 16, 17; 12, 13 of the films 3, 8. Each electric circuit 23 has four series-connected part-capacitors 24, 25, 34, 35, corresponding to three inner series connections. The part-capacitor 24 consists of the metallized area 9 and one of the segments 5 in the metallized area 4, which are coupled together capacitively by means of the dielectric film 8, and the part-capacitor 25 consists of the same segment 5 and the metallized area 36, which are coupled together capacitively by means of the same film 8. Similarly, the part-capacitors 34 and 35 consist of the metallized area 36 and 10, respectively, and one of the segments 5 in the other metallized area 4. Each electric circuit 23 is coupled between the part-capacitors 24 and 25, and between the part-capacitors 34 and 35, to each of its nearest neighbouring circuits by means of resistors 26. The resistors 26 consist of the bridges 7. Each circuit 23 is also coupled between the part-capacitors 25 and 34 to each of its nearest neighbouring circuits by the metallized area 36.

FIG. 11 shows yet another embodiment of two metallized tapes 1, 2 in accordance with the invention, and FIG. 12 shows an equivalent circuit diagram therefor. In this embodiment each of the tapes 1, 2 has a metallized area 4 comprising segments 5 and bridges 7, as well as a non-segmented metallized area 9, 10. The resultant circuits 23 in this case comprise three series-connected part-capacitors 24, 25, 34. The part-capacitor 24 consists of the metallized area 9 of the tape 1 that is capacitively connected to one of the segments 5 of the tape 2. The part-capacitor 25 consists of the same segment 5 that is coupled capacitively to one of the segments 5 of the tape 1, which is capacitively coupled to the metallized area 10 of the tape 2 forming the part-capacitor 34. The resistors 26 consist of the bridges 7.

Exactly as in the case of the metallized tapes 1, 2 described in conjunction with FIG. 1, the bridges 7 connect the segments 5 to each other in non-metallized sections 6 extending perpendicularly or substantially perpendicularly to the long sides 16, 17; 12, 13 of the films 3, 8 or, when a capacitor element is produced by rolling, perpendicularly or substantially perpendicularly to the connection surfaces of the capacitor element. In other words, the bridges 7 connect the segments 5 to each other in a direction that is substantially perpendicular to the load current and, during normal operation, substantially no load current flows through the bridges 7/resistors 26, i.e. the load current appears primarily in the segments 5. The Joule losses associated with conventional, segmented, metallized tapes are thus avoided thanks to the placing of the bridges.

Figure 13:
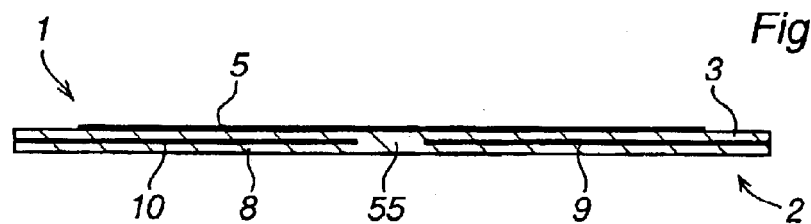
FIG. 13 shows a cross section through the metallized tapes from FIG. 1, where the tapes are arranged close together in an advantageous manner.

FIG. 13 shows a cross section of the metallized tapes 1, 2 from FIG. 1, with the tapes 1, 2 arranged advantageously beside each other. The figure shows the film 3 and one of the segments 5 applied on the film 3. It also shows the film 8 and the metallized areas 9 and 10 applied on the film 8. In this embodiment the films 3, 8 are united in the area between the metallized areas 9 and 10 in a permanent connection 55 of dielectric material, preferably by fusing of the films 3, 8. The permanent connection preferably extends along the entire length of the films 3, 8 so that increased electrical strength is obtained in said united area.

Figure 6:
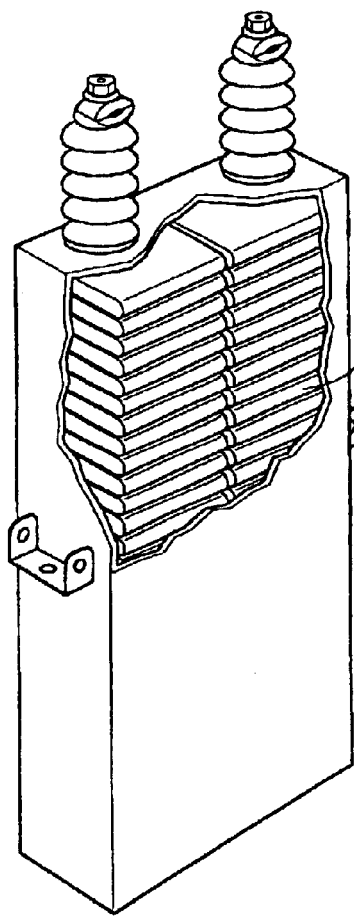
FIG. 6 shows a first embodiment of a power capacitor in accordance with the invention.

FIG. 6 shows a first embodiment of a power capacitor 37 in accordance with the invention, which power capacitor 37 comprises a plurality of connected capacitor elements 20 of the type described above where the load current does not appear in the bridges. The power capacitor 37 is otherwise constructed in conventional manner with a container of metal, and porcelain or polymer bushings. The capacitor elements 20 are conventionally wound to rolls and flattened.

Figure 7:
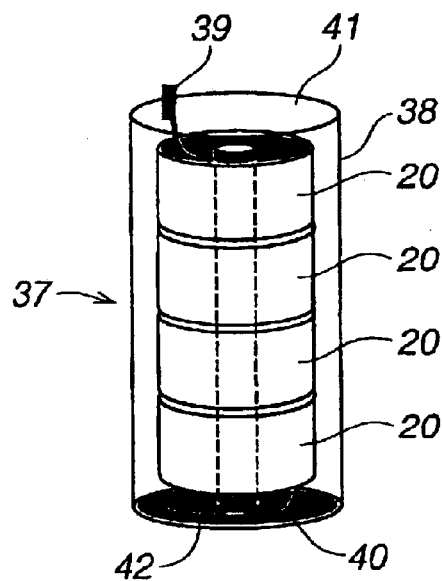
FIG. 7 shows a second embodiment of a power capacitor in accordance with the invention.

FIG. 7 shows a second embodiment of a power capacitor 37 in accordance with the invention. The power capacitor 37 comprises a plurality of capacitor elements 20, in this case four, of the type described above, in which the load current does not appear in the bridges. The capacitor elements 20 are substantially circular-cylindrical in shape and are arranged one on top of the other so that their axial directions coincide. Adjacent capacitor elements 20 are electrically connected at their end surfaces so that the capacitor elements 20 form a series-connected stack. The power capacitor 37 also includes a container 38, substantially circular-cylindrical in shape, in which the stack of capacitor elements 20 is enclosed so that the axial directions of capacitor elements 20 and container 38 coincide. The capacitor elements at the ends of the stack are electrically connected to connectors 39, 40, respectively, running through each end part 41, 42, which connectors 39, 40 form the power capacitor's connection terminals. The container 38 is preferably made of an electrically insulating material.

Figure 9:
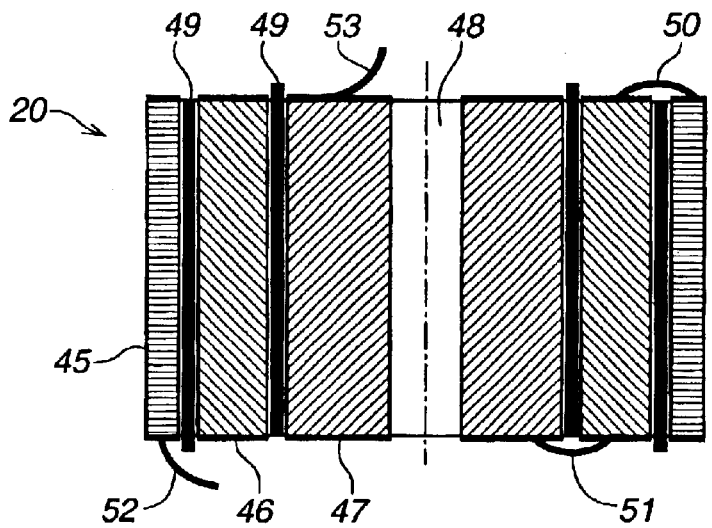
FIG. 9 shows a longitudinal section through an alternative embodiment of a capacitor element in accordance with the invention.

FIG. 9 shows in longitudinal section an alternative embodiment of a capacitor element 20 comprising the metallized tapes described above. The capacitor element 20 is divided into three sub-elements 45, 46, 47 arranged concentrically and having a common axis. The outermost sub-element 45 is substantially tubular and surrounds the middle sub-element 46 with a small gap between them. The middle sub-element 46 surrounds the innermost sub-element 47 in similar manner. The innermost sub-element 47 has a central channel 48 running through it. The various sub-elements have different radial thicknesses, the one with the smallest thickness being outermost. They thus have substantially the same capacitance. Insulation 49 is arranged between the sub-elements 45, 46, 47. The sub-elements 45, 46, 47 are connected in series. Two radially adjacent sub-elements have one of their connection points at the same end. The outermost sub-element 45 is thus connected by means of the coupling device 50 to the middle sub-element 46 at one end of the capacitor element 20, and the middle sub-element 46 is connected by means of the coupling device 51 to the innermost sub-element 47 at the other end of the capacitor element 20. The connections 52, 53 for the capacitor element 20 are thus located one at each end thereof. If the number of sub-elements is greater than three, e.g. five or seven, connection of the coupling points at the ends of the sub-elements should be continued alternately.

Figure 10:
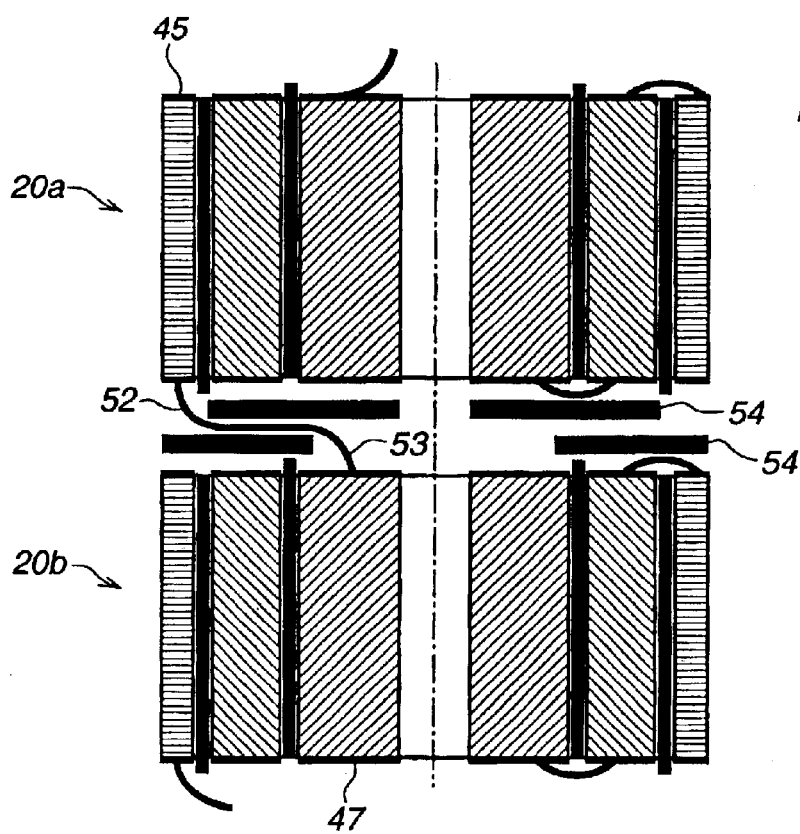
FIG. 10 illustrates a series connection of two of the capacitor elements shown in FIG. 9.

FIG. 10 illustrates how a plurality of capacitor elements of the type shown in FIG. 9 are connected together in series. The figure shows two such elements 20a, 20b. The connection 53 from the lower capacitor element 20b at the upper end of the inner sub-element 47 is coupled to the connection 52 of the upper capacitor element 20a at the lower end of the outer sub-element 45. Insulation 54 is arranged between the capacitor elements 20a, 20b to withstand the potential differences that arise in this type of capacitor.

In a capacitor element in accordance with the invention the dielectric films are preferably of propylene and the metallic electrode material is preferably of a zinc-aluminium alloy, suitably applied on the dielectric films in known manner, using screen-printing or vaporizing technique. With the vaporizing technique an oil film is applied on the surface of the dielectric film by a rotating roller, after which the film is caused to pass before an opening through which vaporized metal is deposited on the surface as dictated by the mask. With the screen-printing technique the conducting electrode material is applied directly on the film from a suitably patterned roller. The films have a thickness that preferably lies in the interval 5–15 micrometer. The metallized areas have a surface resistivity that is preferably within the interval 5–40 Ω/□, except at their long sides where the metallized areas have increased thickness and thus lower resistivity.

Typical dimensions for a capacitor element in the form of a roll are a diameter of 100–300 mm, a bore diameter of 20–90 mm, preferably at least 30 mm, and a height of 50–800 mm. Such a capacitor element is intended for a voltage of about 1–15 kV. A capacitor element with a diameter of 200 mm, a bore diameter of 50 mm and a height of 150 mm, for instance, is intended for a voltage of about 4–10 kV. Voltages of up to about 40 kV can thus be connected across four such capacitor elements coupled in series, as in FIG. 7.

The invention is applicable to both impregnated and unimpregnated capacitor elements.

What is claimed is:

1. A capacitor element for a power capacitor including at least one elongated film layer of dielectric material, and an electrode layer of metal material arranged on each flat side of the at least one film layer, which two electrode layers are divided into at least three metallized areas separated from each other, in order to form an inner series connection arranged to conduct a load current, which the at least three areas extend in the longitudinal direction of the at least one film layer, at least one area of the at least three areas is divided into segments separated by non-metallized sections, and at least one bridge arranged to electrically connect two of the segments together, wherein the at least one bridge is so arranged that, in the at least one area divided into segments, the load current appears substantially only in the segments.

2. A capacitor element as claimed in claim 1, wherein the capacitor element is in the form of a roll and has two parallel end surfaces that form the connection surfaces of the capacitor element, wherein the non-metallized sections at least have a part extending perpendicularly, or substantially perpendicularly to the connection surfaces, and wherein the at least one bridge is arranged in said part.

3. A capacitor element as claimed in claim 1, wherein the segments are uniform.

4. A capacitor element as claimed in claim 1, wherein the at least one area divided into segments has predetermined breadth, and wherein the segments extend across substantially the whole of said breadth.

5. A capacitor element as claimed in claim 1, comprising at least three inner series connections.

6. A power capacitor, comprising at least one capacitor element in accordance with claim 1.

7. A power capacitor as claimed in claim 6, wherein the capacitor element includes a plurality of sub-elements arranged concentrically in relation to each other, the outermost of the radially adjacent sub-elements having a channel, substantially circular-cylindrical in shape, running centrally through it, in close contact with the inner sub-element.

8. A power capacitor as claimed in claim 7, wherein the number of sub-elements in the capacitor element is odd and wherein the sub-elements are connected in series with each other.

9. A power capacitor as claimed in claim 6, comprising a plurality of said capacitor elements, substantially circular-cylindrical in shape, arranged so that their axial directions coincide, and connected to each other so that they form a series-connected capacitor stack.

10. A metallized tape assembly for a power capacitor, comprising a first metallized tape including an elongated dielectric film having two parallel long sides and at least one metallized area on the dielectric film, said at least one metallized area including a plurality of segments separated by non-metallized sections and a plurality of bridges arranged in the non-metallized sections in order to connect the segments together electrically, wherein the non-metallized sections have at least one part extending perpendicularly, or substantially perpendicularly to said long sides, wherein at least one of the bridges is arranged in said at least one part, and wherein said first metallized tape is arranged on a second metallized tape including a dielectric film, so that the dielectric film of the first metallized tape is at least partially in contact with the dielectric film of the second metallized tape, and wherein a permanent connection of a dielectric material unites the films with each other along at least part of their contact surface.

11. A metallized tape assembly as claimed in claim 10, wherein all the bridges are arranged in said part.

12. A metallized tape assembly as claimed in claim 10, wherein the non-metallized sections in said part deviate less than 10° from the perpendicular direction between the long sides.

13. A metallized tape assembly as claimed in claim 10, wherein the segments are uniform.

14. A metallized tape assembly as claimed in claim 10, wherein the permanent connection is formed by fusing of the films.

* * * * *